United States Patent [19]
Chi et al.

[11] 3,899,310
[45] Aug. 12, 1975

[54] ALUMINA-ZEOLITE COMPOSITE ADSORBENTS FOR REFRIGERANTS

[75] Inventors: Donald G. Chi; Hanju Lee, both of Columbia, Md.

[73] Assignee: W. R. Grace & Co., New York, N.Y.

[22] Filed: Mar. 20, 1974

[21] Appl. No.: 452,718

[52] U.S. Cl. .................... 55/71; 252/455 Z; 55/74
[51] Int. Cl.² .................................... B01D 53/04
[58] Field of Search .......... 55/71, 74, 75, 387, 389; 252/455 Z; 210/502

[56] References Cited
UNITED STATES PATENTS

| | | | |
|---|---|---|---|
| 3,224,167 | 12/1965 | Jones | 55/75 X |
| 3,235,089 | 2/1966 | Burroughs | 55/75 |
| 3,420,709 | 1/1969 | Barrett, Jr. et al. | 210/502 X |
| 3,526,322 | 9/1970 | Burroughs | 55/389 X |
| 3,625,866 | 12/1971 | Conde | 252/455 Z |

OTHER PUBLICATIONS
Molecular Sieves for Selective Adsorption, "Freon Drying," Linde Company, Form 9814-B, Nov. 27, 1957.

Primary Examiner—John Adee
Assistant Examiner—Ethel R. Cross
Attorney, Agent, or Firm—Michael J. McGreal

[57] ABSTRACT

A composite alumina-zeolite adsorbent exhibits synergistic properties for the adsorption of fatty acid compounds from refrigerant gases. A composite adsorbent takes up about 30 mg. of fatty acid per gram of adsorbent, while alumina takes up about 21 mg. of fatty acid and zeolites about 9 mg. of fatty acid per gram of adsorbent. A simple comixture would be expected to take up in the range of 9 to 21 mg. of fatty acid, depending on the composition, but the alumina-zeolite composite adsorbents will instead take up about 30 mg. It has also been found that alumina-zeolite composites can be substantially strengthened by a moisture treatment.

7 Claims, No Drawings

ALUMINA-ZEOLITE COMPOSITE ADSORBENTS FOR REFRIGERANTS

This invention relates to a novel alumina-zeolite composite adsorbent which adsorbs greater quantities of fatty acid contaminants than the same amount of either zeolite or alumina would adsorb. This invention also relates to a method for producing a novel alumina-zeolite adsorbent which has a high wet and dry strength.

The organic halocarbons are the most usually used refrigerant gases in refrigerant systems. The halocarbons which have been found useful as refrigerant gases are the fluocarbons, the chlorocarbons, the fluochlorocarbons and some of the fluobromocarbons. Generally the halocarbons will not contain any hydrogen atoms in their structure. Exceptions to this general rule, however, are chlorodifluoromethane, known also as Freon-22 (F-22, R-22), 1,1-dichloro-2,2-difluoroethylene, chlorotrifluoroethylene, tetrafluoroethylene and trifluoroethylene. These various halocarbon gases in refrigeration systems will contain small amounts of organic fatty acids such as oleic acid, lauric acid and stearic acid, due to oxidation of paraffinic oil (white oil) used to lubricate the compressor. These fatty acid contaminants are deleterious to the efficient operation of a refrigerant system since they are preferentially adsorbed on the adsorbent reducing its adsorptive capacity proportionally and since they can cause corrosion within the refrigerant system. It is therefore very desirable to have an adsorbent which has a high adsorption capacity for fatty acids.

It is standard in most refrigeration systems to have an adsorbent in line in the refrigerant system. This adsorbent will take up any moisture, halogen acid and fatty acid compounds. Various materials such as aluminas, silica gels and zeolites have been used as adsorbents in various refrigeration systems. These adsorbents have generally been fairly effective by providing the necessary protection from contaminant materials. Unexpectedly it has now been found that a composite of alumina and zeolite has a synergistic adsorption capacity for fatty acid compounds. As an example, an activated alumina has an adsorption capacity for fatty acids of about 21 milligrams of fatty acid per gram of alumina and a zeolite 4A molecular sieve has a capacity of about 9 milligrams of fatty acid per gram of zeolite. If these two materials are used in a simple admixture, the adsorption capacity is 14 to 15 milligrams of fatty acid per gram of mixed adsorbent. However if the adsorbent is in the form of an alumina-zeolite composite such as a 50-50 alumina-zeolite composite mixture, the fatty acid adsorption capacity is about 30 milligrams per gram of composite adsorbent. For some unexplained reason a composite adsorbent of alumina and zeolite has an adsorption capacity of double that which would be expected from the data available from use as simple admixtures.

It is also a discovery of the present invention that an alumina-zeolite composite can be substantially hardened by means of a moisture curing at 95° to 125°C. Preferably this treatment is a steam treatment at about 100° to 110°C. Such a treatment substantially increases both the dry and wet strength of the alumina-zeolite composites. This discovery makes this composite alumina-zeolite adsorbent commercially feasible. A composite adsorbent without this curing has a high fatty acid capacity but a considerably weaker strength. The composite is not nearly as strong as alumina alone. Also, as the zeolite content increases, the strength decreases. The steam curing of the composite, although it does not reverse or negate this effect with high zeolite contents, produces a particle strength for high zeolite content adsorbents that meets or exceeds that for alumina alone. A low temperature steam curing increases the alumina strength without decreasing adsorbent capacity or otherwise deleteriously affecting the adsorbent.

It is therefore a prime object of this invention to set out a novel synergistic adsorbent for removing organic fatty acids from halocarbon refrigerants. Another object of this invention is to set out a preferred method for producing an alumina-zeolite composite adsorbent which has high synergistic activity for the adsorption of fatty acid compound and a high wet and dry strength.

These and other objects and advantages of this invention will be more thoroughly discussed and described herein.

The adsorbent which has been found to be of prime usefulness is an alumina-zeolite composite wherein the zeolite content is in the range from about 20 percent by weight to about 90 percent by weight. The remainder of the composite is essentially alumina. The useful zeolites are those which have a pore size of about 3 angstroms to about 6 angstroms. The preferred zeolites are those which have been designated zeolite 3A, zeolite 4A and zeolite 5A. Zeolite 4A is the sodium form of zeolite A and has an average pore size of about 4 angstroms. When the sodium ions of zeolite 4A are substantially replaced by potassium ions there is produced a zeolite 3A wherein the average pore size is now about 3 angstroms. When the sodium ions in a zeolite 4A are replaced by calcium ions there is produced a zeolite 5A which has an average pore size of about 5 angstroms. These are the preferred zeolite components of the alumina-zeolite composite although other zeolites such as various ion forms of zeolite X and zeolite Y can be used. These zeolites have larger pore sizes and are generally not preferred adsorbents for refrigerant systems. Also useful but not preferred are various naturally occurring zeolite materials such as mordenite, erionite, gmelnite, heulandite, chabazite and offretite.

The alumina component is an alpha-alumina monohydrate. This type of alumina is a conventional alumina which is used as an adsorbent. In the synthesis of the composite adsorbent, the alumina and the zeolite are dry blended. The ratio of alumina to zeolite is in the ratio range of about 20 to 80 percent alumina to about 80 to 20 percent zeolite. After dry blending, water is added to the mix to form a pasty mass consistency. This pasty mass is then formed into a shape such as spheres, cylindrical extrudates, or other such shape and cured by heating at 90 to 125°C for about 24 to 100 hours, preferably 30 to 60 hours under humid atmosphere. This curing is a steam aging step and is either conducted in a closed container so that the composites are in a self-generated steam or by passing a low pressure stream through a bed of the composites. The steam environment is one in which steam makes up at least about 50 percent by weight of the gaseous atmosphere. This curing step is necessary in order to produce a composite which has a high dry and wet strength. Cured composites have a dry and wet strength which is about 2 to 10 times greater than a composite which has not been cured. This curing step does not affect the synergistic properties of the composite adsorbent, but it makes the composite adsorbent strong enough to be a commercially very useful material. That is, a material although it has a high adsorption capacity for fatty acids, would not be commercially desirable if it did not also have at least a high dry strength. Materials of low strength tend to attrite during use and produce a dust-like powder throughout a refrigeration system. Such a dust-like powder significantly decreases the life of refrigeration system seals and valves. The curing step makes alumina-zeolite composites useful adsorbents since the strength is increased to a very acceptable level.

After the curing step the composites are dried to a water content of less than about 20 percent by weight. This drying is effected by heating the composites to about 100° to 125°C in open air for about 1 to 96 hours. Subsequent to drying, the composites are activated by heating them to about 200° to 700°C for about 0.25 to 4 hours. During the activation step the closely held water molecules within the zeolite and alumina are removed thereby bringing the composites to their working adsorption capacity.

After activation the adsorbent is now ready for use in a refrigeration system. In normal usage about 0.45 to about 10 kilograms are placed in a chamber which is in line in a refrigeration system. By "in line" is meant that the adsorbent chamber is in a position in the refrigeration system such that the refrigerant gas passes through the adsorbent during each cycle of the system. The amount of adsorbent which is used is calculated to be from 2 to 25 times that which would be theoretically necessary during the lifetime of a refrigerant system. An excess of adsorbent is used since many refrigerant systems have refrigerant gas added periodically in order to maintain a set pressure. There must be a sufficient amount of adsorbent used so that a reasonable amount of refrigerant gas can be added without the threat of overloading the adsorbent. Of course if there are major overhauls of the refrigerant system, there will also be a replacement of the adsorbent material.

The present unique and unexpected discovery is that a composite adsorbent of alumina and zeolite has about twice the capacity of a simple admixture of alumina and zeolite and therefore has a capacity about double what would be expected. That is, the composite alumina-zeolite adsorbent has a capacity for organic fatty acids of about double what would be expected. The reason for this effect is not known, but it is hypothesized that by having the mixture of zeolite and alumina there is formed an intricate pore structure in the composite which allows a greater active surface area for adsorption of the organic fatty acid material. That is, there is an increase in the amount of the alumina and the zeolite which is available to the organic fatty acid for adsorption of organic fatty acid. This is only hypothesis, but is put forth as the best possible explanation of the present synergistic effect.

The description of the invention will now be amplified by recourse to the following examples.

EXAMPLE 1

This example shows the stepwise procedure for making the hard alumina-zeolite composites.

1975 grams of zeolite 4A powder (17 percent moisture content) is dry blended with 1,540 grams of KA300 alumina powder 2 percent moisture content). 1,172 ml of water is then added to the blended mixture and mixed to form a paste-like mixture. This mixture is then formed into 4–8 mesh balls and cured for about 60 hours at 100°–110°C. The curing consists of heating in a closed vessel. The composites are then oven-dried at 100°–110°C in an open container and activated by heating at 370°C for 2 hours. This activation reduces the moisture content of the composites to less than about 1 percent.

EXAMPLE 2

The procedure of Example 1 was repeated except that the curing step was deleted. After forming, the composites were dried and activated. The following Table gives a comparison of the strength and water vapor capacities of the products of Examples 1 and 2.

Table 1

| Example | Strength (lbs) | | Water Vapor Capacity | | |
| | Dry | Wet | 10% RH | 20% RH | 80% RH |
| --- | --- | --- | --- | --- | --- |
| 1 | 35.1 | 18.0 | 13.85 | 15.71 | 23.98 |
| 2 | 15.1 | 6.0 | 14.57 | 16.31 | 27.17 |

This table illustrates that the curing step is necessary in order to achieve a sufficient particle strength. By curing, the dry strength is increased more than twofold and the wet strength is increased more than threefold. There is further no commercially significant decrease in the capacity of the adsorbent.

EXAMPLE 3

The following Table 2 sets out the properties of alumina-zeolite adsorbents produced according to the general procedure of Example 1. The effect of different zeolites, amounts of zeolite in the composite and degree of curing is compared to the wet and dry strengths of the composites.

Table 2

| Type | Zeolite Percent by weight | Alumina Percent by weight | Curing (Day) | Activation Temperature (C°) | Apparent Bulk Density (lb/cu. ft.) | Strength (lb.) | |
| | | | | | | Dry | Wet |
| --- | --- | --- | --- | --- | --- | --- | --- |
| 3A | 80% | 20% | 0 | 650 | 39.9 | 1.9 | 0 |
| 3A | 80% | 20% | 1 | 650 | 39.9 | 9.4 | 2.8 |
| 3A | 80% | 20% | 4 | 370 | 41.2 | 18.6 | 4.5 |
| 3A | 80% | 20% | 4 | 650 | 41.2 | 18.6 | 4.4 |
| 3A | 50% | 50% | 0 | 370 | 42.4 | 30.0 | 8.2 |
| 3A | 50% | 50% | 1 | 370 | 43.0 | >40 | 9.7 |
| 3A | 50% | 50% | 3 | 370 | 41.8 | >40 | 18.5 |
| 4A | 70% | 30% | 0 | 370 | 31.8 | 7.5 | 2.7 |
| 4A | 70% | 30% | 1 | 370 | 33.7 | 16.8 | 10.2 |
| 4A | 50% | 50% | 0 | 370 | 43.0 | 11.7 | 3.0 |
| 4A | 50% | 50% | 3 | 370 | 43.0 | >37 | 34.7 |

EXAMPLE 4

A 50 weight percent zeolite 4A-50 weight percent alumina composite adsorbent was contacted with chlorodifloromethane (R-22) refrigerant containing oleic acid in quantity equivalent to 0.05 acid number. Acid number, by definition, is the number of milligrams of potassium hydroxide required to neutralize the free fatty acids in a gram of substance. Based on stoichiometric calculation, the 0.05 acid number is equivalent to 0.25 mg oleic acid per gram of R-22, or 250 mg per kg of R-22. The adsorption of oleic acid by the adsorbent was 30 mg/gm of adsorbent.

For comparison, an activated alumina and a zeolite 4A were contacted with the above refrigerant. The adsorption of oleic acid by the activated alumina was 21 mg/gm of adsorbent, and the adsorption of oleic acid by the zeolite 4A was 9 mg/gm of adsorbent. The composite adsorbent has an unexpected increase in activity over what would be expected.

What is claimed is:

1. A method for removing fatty acid contaminants from a halocarbon refrigerant gas comprising contacting said gas with a composite alumina-zeolite adsorbent formed from blended zeolite and alumina powders, said zeolite component having a pore diameter of 3 to 6 angstroms and comprising 20 to 80 percent by weight of said composite and the remainder being alumina.

2. A method as in claim 1 wherein said composite contains about 30 to 65 percent by weight of said zeolite component and said halocarbon is a fluocarbon.

3. A method as in claim 2 wherein said composite contains about 50 percent by weight of said zeolite component.

4. A method as in claim 1 wherein said fatty acid contaminant is oleic acid and said refrigerant gas is selected from the group consisting of dichlorodifluoromethane, chlorodifluoromethane, trichlorofluoromethane, chlorotrifluoromethane, dichlorofluoromethane, trifluoromethane, trichlorotrifluoroethane, dichlorotetrafluoroethane, dibromotetrafluoroethane, chloropentofluoroethane, hexafluoroethane and other fluorocarbon compounds.

5. A method as in claim 1 wherein said zeolite component is a member selected from the group consisting of zeolite 3A, zeolite 4A and zeolite 5A.

6. A method as in claim 5 wherein said composite contains about 30 to 65 percent by weight of said zeolite component and said halocarbon is a fluocarbon.

7. A method as in claim 6 wherein said fatty acid contaminant is oleic acid and said refrigerant gas is selected from the group consisting of dichlorodifluoromethane, chlorodifluoromethane, trichlorofluoromethane, chlorotrifluoromethane, tetrafluoromethane, dichlorofluoromethane, trifluoromethane, trichlorotrifluoroethane, dichlorotetrafluoroethane, dibromotetrafluoroethane, chloropentofluoroethane, hexafluoroethane and other fluorocarbon compounds.

* * * * *